United States Patent
Moorhouse et al.

(10) Patent No.: US 6,225,264 B1
(45) Date of Patent: May 1, 2001

(54) SUSPENDED DELAYED BORATE CROSS-LINKER

(75) Inventors: Ralph Moorhouse; Gong Chen, both of Houston, TX (US)

(73) Assignee: Benchmark Research & Technology, Midland, TX (US)

( * ) Notice: Subject to any disclaimer, the term of this patent is extended or adjusted under 35 U.S.C. 154(b) by 0 days.

(21) Appl. No.: 09/470,524

(22) Filed: Dec. 22, 1999

Related U.S. Application Data

(63) Continuation of application No. 09/165,962, filed on Oct. 2, 1998.
(51) Int. Cl.$^7$ ....................................................... C09K 3/00
(52) U.S. Cl. ........................... 507/273; 507/903; 507/922
(58) Field of Search .................................... 507/273, 903, 507/922

(56) References Cited

U.S. PATENT DOCUMENTS

| | | | |
|---|---|---|---|
| 3,799,874 | * | 3/1974 | Parker .................................. 507/273 |
| 4,619,776 | * | 10/1986 | Mondshine .......................... 507/273 |
| 5,026,421 | * | 6/1991 | Le Loarer ............................... 106/3 |
| 5,929,002 | * | 7/1999 | Joyce ................................... 507/922 |
| 5,948,733 | * | 9/1999 | Cawiezel .............................. 507/922 |
| 6,024,170 | * | 2/2000 | McCabe et al. ..................... 507/903 |

FOREIGN PATENT DOCUMENTS 0962626    12/1999    (EP) .

* cited by examiner

*Primary Examiner*—Philip Tucker
(74) *Attorney, Agent, or Firm*—Christopher L. Makay

(57) ABSTRACT

A composition for delaying the cross-linking of water soluble polymer solutions includes a boron source suspended by an organophilic clay in a solution of a non-aqueous solvent. One process of manufacturing the composition includes the steps of first suspending the organophilic clay in the non-aqueous solvent and then suspending the boron source in the organophilic clay- non-aqueous solvent suspension. Another process of manufacturing composition includes the steps of first mixing the boron source and the organophilic clay to form a dry mixture and then suspending the dry mixture of the boron source and the organophilic clay in a non-aqueous solvent. In a method of hydraulically fracturing a formation, a water soluble polymer solution with a pH between about 8.5 and 12.5 and the boron source suspended by the organophilic clay in the solution of the non-aqueous solvent are pumped into the formation under sufficient pressure to cause a fracture in the formation rock.

40 Claims, No Drawings

SUSPENDED DELAYED BORATE CROSS-LINKER

This application is a continuation of application U.S. Ser. No. 09/165,962, filed Oct. 2, 1998, pending.

BACKGROUND OF THE INVENTION

1. Field of the Invention

The present invention relates to compositions for controlling the gelation rates of water soluble polymer solutions used as fracturing fluids in well fracturing operations and, more particularly, but not by way of limitation, to suspensions of boron sources, an organophilic clay, and a non-aqueous solvent. The suspension provides a stable, non-aqueous, pumpable, source of borate ions suitable for use as a gelling agent for water soluble polymer solutions.

2. Description of the Related Art

To perform a hydraulic fracturing operation, a fracturing fluid comprising a proppant-laden water soluble polymer solution of guar, hydroxypropyl guar (HPG), carboxymethyl guar (CMG), or carboxymethyl hydroxypropyl guar (CMHPG) is injected under high pressure into a formation through a well bore. Once the natural confining pressures of the formation rock are exceeded, the fracturing fluid initiates a fracture in the formation rock that generally continues to grow during pumping. Hydraulic fracturing of the formation typically requires the fracturing fluid to reach its maximum viscosity as it enters the fracture. Increased viscosity of the fracturing fluid, which improves its capacity to fracture the formation rock, usually occurs through the gelling of the water soluble polymer solution utilized as the hydraulic fracturing fluid. Gelation of water soluble polymer solutions is typically achieved by the addition of aluminum, boron, titanium or zirconium ions, or mixtures thereof to the polymer solution.

However, if the fracturing fluid gels within the well bore, it encounters a high shear due to the limited cross-sectional area within the well bore. High shear experienced in the well bore may cause extensive and irreparable degradation to the cross-linked fracturing fluid. Furthermore, high viscosities in the fracturing fluid produce excessive back or friction pressures within the well bore and formation, thereby limiting the pumping rate and possibly the success of the hydraulic fracturing operation. Various borate ion cross-linking systems have been developed which delay the gelation of the fracturing fluid during its pumping through the well bore.

One such borate ion cross-linking system is disclosed in U.S. Pat. No. 4,619,776 issued on Oct. 28, 1986, to Mondshine. Mondshine discloses the use of alkaline earth metal borates. The boron minerals disclosed are sparingly soluble in the water soluble polymer solutions. After the introduction of the Mondshine borate formulation into a water soluble polymer solution, the borate source(s) slowly dissolves to release the borate ions, which gradually cross-link the polymer solution. That is, the slow solubility of the sparingly soluble borate minerals creates a cross-linking system that delays the transformation of polymer solutions into gelled, highly viscous fracturing fluids.

Although the borate ion cross-linking system disclosed by Mondshine delays the gelation of water-soluble polymer solutions, it suffers from several disadvantages. The cross-linking delay is determined by the solubility of the sparingly available borate. This limited solubility of the borate source impedes controlling the cross-linking delay due to the scarcity of borate ions. This can only be provided by modifying the base formulation of the product. For example, a system requiring a delay of X minutes may need a formulation A, while a system requiring a delay of Y minutes may need a different formulation B. Thus, the Mondshine system fails to provide variable delay control from a single product formulation. Furthermore, the Mondshine system is restricted to formations having bottom hole temperatures below about 230° F. (110° C.), indeed Mondshine suggests the incorporation of organometallic crosslinking agents to enhance performance of the fluid system above 275° F. (135° C.). Additionally, the Mondshine system experiences the potentially negative effect of other components in the borate source, e.g. calcium or magnesium ions, interacting with the polymer and, thus, interfering with the crosslink reaction.

An alternative borate ion cross-linking system is disclosed in U.S. Pat. Nos. 5,082,579; 5,145,590; and 5160,643; which issued to Dawson. These patents disclose a borate ion based aqueous complexor solution that delays the gelation of water soluble polymer solutions. The aqueous complexor solution consists of a cross linking additive that provides borate ions and a delay additive in solution that serves to chemically bond with the borate ions to reduce the availability of boron to the hydrated polymer in solution.

Although the Dawson borate ion cross-linking system provides improvements to some of the deficiencies characteristic of the Mondshine system, such as lack of control over the gelation rate, the Dawson system still suffers from a number of disadvantages. The amount of available borate ions in solution may be sufficient to cross link all of the polymer in solution due to the presence of the delay additive. The dilution of borate ions caused by the presence of the delay additive creates a demand for considerably higher quantities of borate ions than required in a stoichiometrically balanced system. The requirement for additional boron in excess of that necessary for a stoichiometrically balanced system increases the cost of the Dawson borate ion cross linking system. Another disadvantage is that manufacturing the Dawson cross-linker is lengthy and burdensome. A further disadvantage of the Dawson system is caused by the undesirable necessity of having to use large quantities of carbonate buffers, such as potassium carbonate, to obtain effective delay and temperature stability of the fracturing fluid, which is length of time the crosslinked fluid maintains viscosity above a given minimum at a given temperature and shear rate on a Model 50 viscometer. Furthermore, due to the presence of the delay additive in solution with the borate ions, the cross-linking action of the complexor solution is thermally delayed, i.e., the onset of crosslinlig or gelation does not occur until a certain temperature is reached. The thermal delay of the Dawson system thus restricts use of that system to formulations having bottom hole temperatures higher than about 125° F. Finally, and perhaps most importantly, during storage, the borate ions in the Dawson complexor solution may precipitate rendering the complexor solution deficient in boron.

Another borate ion cross-linking system is disclosed in U.S. Pat. No. 5,488,083 issued on Jan. 30, 1996, to Kinsey, et al. The Kinsey system utilizes an anhydrous boron compound suspended in a mineral spirits resin solution. The resulting suspension is added to a water soluble polymer solution to achieve a cross-linked fracturing fluid. Although the Kinsey cross-inking system provides improvements to some of the deficiencies of the prior art, such as controllable delay and high concentration of boron content in the cross-linking agent, this system still suffers from several disadvantages. The cross-linking agent is extremely water sensitive, in that the cross-linker forms a cake or sludge in the presence of water, thereby making the product difficult to handle in the field due to the potential for contamination from pumps or lines that have had water in them. The Kinsey system also has operability limitations. During transport to field locations, settling may occur and re-suspension requires more than simple stirring, and the use of air wands or circulating pumps increases the chance of water contamination. Additionally, the Kinsey system is difficult and costly to dilute, thereby impeding metering at low treatment rates that demand low cross-linker concentrations.

A further borate ion cross-linking system is disclosed in U.S. Pat. No. 5,372,732 issued on Dec. 13, 1994, to Harris et al. The Harris system discloses a cross-linking agent that contains a borate source compounded with a water soluble polysaccharide. The Harris system provides a borate cross-linking agent that is convenient to use at a well site, however, the Harris system is expensive to manufacture and provides poor control of the cross-linking reaction.

Still another borate ion cross-linking system is disclosed in U.S. Pat. No. 3,974,077, which issued on Aug. 10, 1976 to Free. The Free cross-linking system includes a borate source and a water-soluble polymer solution. A basic compound, such as sodium hydroxide or magnesium oxide, raises the pH of the fluid to begin cross-linking. The Free system, however, suffers from a lack of control of the cross-linking delay. Gelation is often too rapid where sodium hydroxide is used to raise the pH often too slow where magnesium oxide is used to raise the pH. Moreover, the Free system is inflexible in using variable concentrations of fluid alkalinity. Fluid alkalinity is a key factor for the performance of the borate cross-linked fluid. Lack of fluid alkalinity flexibility impedes adjusting the process to improve cross-linking performance. Furthermore, a strong alkali is needed to increase the performance of the cross-linked fluid and Free's use of sodium hydroxide does not provide for controllable gelation. Magnesium oxide is a weak alkali, which diminishes the performance of the borate cross-linked fluid. Without modifications to address the presence of magnesium where magnesium oxide is used to facilitate the gelation of the borate cross-linked fluid, the formation of magnesium hydroxide at certain elevated temperatures limits the temperature stability of the fluid.

Accordingly, a borate ion cross-linking system that provides a controllable cross linking delay; provides a high content and supply of borate; is easy to manufacture, transport, and use at the field site; and is economical will improve over other currently available borate cross-linking system.

SUMMARY OF THE INVENTION

In accordance with the present invention, a composition for delaying the cross-linking of water soluble polymer solutions includes a boron source suspended by an organophilic clay in a solution of a non-aqueous solvent. One process of manufacturing the composition includes the steps of first suspending the organophilic clay in the non-aqueous solvent and then suspending the boron source in the organophilic clay-non-aquueous solvent suspension. Another process of manufacturing composition includes the steps of first mixing the boron source and the organophilic clay to form a dry mixture and then suspending the dry mixture of the boron source and the organophilic clay in a non-aqueous solvent. The dry mixture of the boron source and the organophilic clay is suitable for storage and shipping prior to suspension in the non-aqueous solvent.

In the composition produced through the above processes, the boron source comprises from about 1% to 50% total composition weight and is selected from a group consisting of an anhydrous boron compound and a non-anhydrous boron compound. The anhydrous boron compound is selected from a group consisting of anhydrous borax, anhydrous boric acid, and mixtures thereof. The non-anhydrous boron compound is selected from a group consisting of non-anhydrous borax (various grades), non-anhydrous boric acid, polybor™, and mixtures thereof The organophilic clay in the above composition comprises from about 0.5% to 15% total composition weight and is a reaction product of a smectite-type clay and at least one type of organic cation. The organophilic clay is either self-activating or non-self-activating.

The non-aqueous solvent in the above composition comprises from about 53% to 98% total composition weight and is preferably a hydrocarbon solvent, such as diesel. Although the preferred non-aqueous solvent is a hydrocarbon solvent, such as diesel, the non-aqueous solvent may be selected from a group consisting of mineral oils, kerosene, alcohols, vegetable oils, ester-alcohols, polyol ethers, and the like.

A method of hydraulically fracturing a formation includes preparing a water soluble polymer solution. The pH of the water soluble polymer solution is then adjusted to between about 8.5 and 12.5. Next, the boron source suspended by the organophilic clay in the solution of the non-aqueous solvent is added to the water soluble polymer solution. Finally, the water soluble polymer solution and the boron source suspended by the organophilic clay in the solution of the non-aqueous solvent are pumped into the formation under sufficient pressure to cause a fracture in the formation rock. As is typical in hydraulic fracturing operations, proppants designed to maintain highly conductive fractures are usually incorporated into the fracturing fluid, together with other typical additives, such as surfactants, non-emulsifiers, clay stabilizers, breakers, etc. In hydraulically fracturing a formation, the boron source suspended by the organophilic clay in the solution of the non-aqueous solvent may be diluted without diminishing its delay properties prior to addition to the water-soluble polymer solution.

It is, therefore, an object of the present invention to provided a suspension that provides a controllable cross-linking delay.

It is another object of the present invention to provide a suspension that improves operability by being easily re-suspended and by being dilutable for low rates of formation fracturing.

It is a further object of the present invention to provide a suspension that is economic to manufacture and transport to a field site.

It is still another object of the present invention to provide a dry mixture that may be transported for suspension in a non-aqueous solvent at the well site.

Still other objects, features and advantages of the present invention will become evident to those of ordinary skill in the art in light of the following.

DETAILED DESCRIPTON OF THE PREFERRED EMBODIMENT

A stable, non-aqueous suspension of a delayed boron cross-linker includes a boron source suspended by organophilic clay in a solution of a non-aqueous solvent. In this preferred embodiment, suitable organophilic clays are the reaction products of smectite-type clays and organic cations, i.e., quaternary ammonium compounds, preferably self-activating clays, as described in Mattingly, U.S. Pat. No.

5,186,747, although non-self activated clays may also be used. The production of the stable, non-aqueous suspension of the delayed boron cross-linker requires that the organophilic clay be thoroughly dispersed throughout in order to achieve desired Theological properties of thickening. A method of obtaining proper dispersion and activation of the organophilic clay involves the use of polar activators, dispersants, dispersion aids, solvating agents, and the like, as described in U.S. Pat. No. 5,186,747 and referenced patents therein. Such compounds are typically liquids and are added along with the organophilic clay. Another method of obtaining proper dispersion and activation, as discussed in U.S. Pat. No. 5,186,747, is to dry blend a pre-activator into the organophilic clay such that it develops the desired rheology without the addition of an activator. Accordingly, two types of organophilic clays may be used in the production of the stable, non-aqueous suspension of the delayed boron cross-linker; namely, non-activated (i.e., require a separate activator) or self-activated (i.e., no additional activator is required).

In this preferred embodiment, the boron source includes, but is not limited to, an anhydrous boron compound, such as anhydrous borax, anhydrous boric acid, or a mixture thereof and a non-anhydrous boron compound, such as non-anhydrous borax, non-anhydrous boric acid, or a mixture thereof. The chemical formulas for the borax and boric acid are expressed as $Na_2B_4O_7$ and $B_2O_3$, respectively.

In this preferred embodiment, the non-aqueous solvent is preferably a hydrocarbon solvent, such as diesel, however, one of ordinary skill in the art will recognize that the non-aqueous solvent could include, mineral oils, kerosene, alcohols (6–12 carbons), vegetable oils, ester-alcohols, polyol ethers, and the like. Specific formulations of the alternative non-aqueous solvents include, but are not limited to:

1. Aliphatic of the formulae $C_nH_{2n+2}$, $C_nH_2$, and $C_nH_{n+1}$ where N is 6 or greater and mixtures thereof, such as diesel oil, kerosene (white oil), gasolines, mineral oils, and lubricating oils;
2. Crude oil distillates such as mineral spirits and mixtures of aliphatics, ketones, aldehydes, esters, ethers, glycols, and alcohols;
3. Vegetable oils such as peanut oil, linseed oil, corn oil cotton oil, soy oil, and tall oil;
4. Primary, secondary, and tertiary alcohols of 6–12 carbons;
5. Turpentine;
6. Glycol ethers such as phenyl glycol ethers;
7. Glycols such as polypropylene glycol of formula weight greater than 1000;
8. Ester alcohols such as 2,2,4-trimethylpentanediol-1,3 monoisobutyrite;
9. Animal oils such as fish and beef fat oils;
10. Silicone oils; and
11. Halogenated solvents.

In a first method of preparing a stable, non-aqueous suspension of a delayed boron cross-linker, the organophilic clay is first suspended in the non-aqueous solvent to form an intermediate product. The boron source is then suspended in the intermediate product to form the stable, non-aqueous suspension of the delayed boron cross-linker. The resulting stable, non-aqueous suspension of the delayed boron cross-linker forms a stable slurry that is added to a hydrated water-soluble polymer solution for creating a fracturing fluid.

A second method of preparing a stable, non-aqueous suspension of a delayed boron cross-linker, includes a first step of mixing the boron source and the organophilic clay, thereby forming a dry mixture. The second step includes suspending the dry mixture of the boron source and the organophilic clay in the non-aqueous solvent. The dry mixture of the boron source and the organophilic clay is stable, which permits its storing and shipment prior to suspension in the non-aqueous solvent. This second method, therefore, reduces shipping costs by permitting the shipment of the dry mixture of the boron source and the organophilic clay, which is then mixed on-site with the non-aqueous solvent. The resulting stable, non-aqueous suspension of the delayed boron cross-linker forms a stable slurry that is added to a hydrated water-soluble polymer solution for creating a fracturing fluid.

Using either one of the above-described methods, the cross-linking suspension is prepared by applying the organophilic clay in a range of from about 0.5% to 15% by weight, the boron source in a range of from about 1% to 50% by weight, and the non-aqueous solvent in a range of from about 53% to 98% by weight.

Hydrated water-soluble polymer solutions suitable for use in creating a cross-linked fracturing fluid may be any of the hydratable polysaccharides that are capable of gelling in the presence of borate ions to form a gelled base fluid. Suitable hydratable polysaccharides are the galactomannan gums, glucomannan gums, guars, derivatized guars and cellulose derivatives. Specific examples are guar gum, guar gum derivatives, locust bean gum, tara gum, karaya gum, cassia gum, carboxymethyl cellulose, carboxymethylhydroxyethyl cellulose and hydroxyethyl cellulose. The preferred gelling agents include, but are not limited to, guar gum, hydroxypropyl guar, carboxymethyl guar, and carboxymethylhydroxypropyl guar and carboxymethylhydroxyethyl cellulose. A suitable synthetic polymer is polyvinyl alcohol. The most preferred hydratable polymers are guar gum, hydroxypropyl guar, carboxymethyl, guar and carboxymethylhydroxypropyl guar.

Examples of Stable, Non-Aqueous Suspensions of Delayed Boron Cross-Linkers and Corresponding Methods of Preparation

EXAMPLE I

A stable, non-aqueous suspension of a delayed boron cross-linker may be prepared by mixing an organophilic clay, such as TX-1178™ which is available from Süd-Chemie Rheologicals, United Catalysts Inc., P.O. Box 32370, Louisville, Ky. 40232, USA, in an amount of 4% total weight and No. 2 diesel fuel (off-road) in an amount of 71% total weight for approximately 35 minutes utilizing an overhead stirrer operated at approximately 800 rpm. Upon the expiration of the approximately 35 minutes, fine anhydrous borax having a particle size of smaller than about 60 mesh is added to the mixture in an amount of 25% total weight and agitated for approximately 60 minutes at approximately 830 rpm. The resulting stable, non-aqueous suspension of a delayed boron cross-linker contains boron as $B_2O_3$ in an amount of 17.3% by weight.

EXAMPLE II

A stable, non-aqueous suspension of a delayed boron cross-linker may be prepared by mixing an organophilic clay, such as TX-1178™ which is available from Süd-Chemie Rheologicals, United Catalysts Inc., P.O. Box 32370, Louisville, Ky. 40232, USA, in an amount of 4% total weight and No. 2 diesel fuel (off road) in an amount of 71% total weight for approximately 60 minutes utilizing an overhead stirrer operated at approximately 850 rpm. Upon the expiration of the approximately 60 minutes, a mixture of fine anhydrous borax in an amount of 20% total weight and fine boric acid in amount of 5% total weight is added to the mixture and agitated for approximately 60 minutes at approximately 850 rpm. The resulting stable, non-aqueous suspension of a delayed boron cross-linker contains boron as B203 in an amount of 16.6% by weight.

EXAMPLE III

A stable, non-aqueous suspension of a delayed boron cross-linker may be prepared by mixing an organophilic clay, such as TX-1178™ which is available from Süd-Chemie Rheologicals, United Catalysts Inc., P.O. Box 32370, Louisville, Ky. 40232, USA, in an amount of 4% total weight and No. 2 diesel fuel (off-road) in an amount of 71% total weight for approximately 60 minutes utilizing an overhead stirrer operated between approximately 750–850 rpm. Upon the expiration of the approximately 60 minutes, a mixture of fine anhydrous borax in an amount of 15% total weight and fine boric acid in amount of 10% total weight is added to the mixture and agitated for approximately 60 minutes at approximately 850 rpm. The resulting stable, non-aqueous suspension of a delayed boron cross-linker contains boron as B203 in an amount of 16.0% by weight.

EXAMPLE IV

A stable, non-aqueous suspension of a delayed boron cross-linker may be prepared by mixing an organophilic clay, such as TIXOGEL VP™ which is available from Süd-Chemie Rheologicals, United Catalysts Inc., P.O. Box 32370, Louisville, Ky. 40232, USA, in an amount of 4% total weight and No. 2 diesel fuel (off-road) in an amount of 69.4% total weight for approximately 30 minutes utilizing an overhead stirrer operated at approximately 550 rpm. Upon the expiration of the approximately 30 minutes, propylene carbonate, which is necessary to activate the organophilic clay, is added to the mixture in an amount of 1.6% total weight and agitated for approximately 30 minutes at approximately 850 rpm. After the expiration of the approximately 30 minutes, fine anhydrous borax in an amount of 25% total weight is added to the mixture and agitated for approximately 2 minutes at approximately 750 rpm and for approximately 2 minutes at approximately 850 RPM. The resulting stable, non-aqueous suspension of a delayed boron cross-linker contains boron as B203 in an amount of 17.3% by weight.

EXAMPLE V

A stable, non-aqueous suspension of a delayed boron cross-linker may be prepared by mixing an organophilic clay, such as TIXOGEL MP-100™ which is available from Sud-Chemie Rheologicals, United Catalysts Inc., P.O. Box 32370, Louisville, Ky. 40232, USA, in an amount of 4% total weight and No. 2 diesel fuel (off-road) in an amount of 71% total weight for approximately 37 minutes utilizing an overhead stirrer operated between approximately 750 and 850 rpm. Upon the expiration of the approximately 37 minutes, fine anhydrous borax in an amount of 25% total weight is added to the mixture agitated for approximately 60 minutes at approximately 850 rpm. The resulting stable, non-aqueous suspension of a delayed boron cross-linker contains boron as B203 in an amount of 17.3% by weight.

EXAMPLE VI

A stable, non-aqueous suspension of a delayed boron cross-linker may be prepared by mixing an organophilic clay, such as TIXOGEL TE™ which is available from Süd-Chemie Rheologicals, United Catalysts Inc., P.O. Box 32370, Louisville, Ky. 40232, USA, in an amount of 4% total weight and No. 2 diesel fuel (off-road) in an amount of 71% total weight for approximately 36 minutes utilizing an overhead stirrer operated at approximately 830 rpm. Upon the expiration of the approximately 36 minutes, fine anhydrous borax in an amount of 25% total weight is added to the mixture agitated for approximately 60 minutes at approximately 850 rpm. The resulting stable, non-aqueous suspension of a delayed boron cross-linker contains boron as B203 in an amount of 17.3% by weight.

EXAMPLE VII

A component for a stable, non-aqueous suspension of a delayed boron cross-linker may be prepared by adding to an overhead stirrer 1 part of organophilic clay, such as TX-1178™ which is available from Sud-Chemie Rheologicals, United Catalysts Inc., P.O. Box 32370, Louisville, Ky. 40232, USA, for every 6.25 parts of anhydrous borax and then agitating for approximately 10–15 minutes at approximately 600–700 RPM to form a dry blend of organophilic clay and fine anhydrous borax. The resulting dry blend of organophilic clay and fine anhydrous borax may be stored and shipped prior to mixture with a suitable non-aqueous solvent, such as No. 2 diesel fuel (off road). The stable, non-aqueous suspension of the delayed boron cross-linker may be prepared by mixing the dry blend of the organophilic clay and the fine anhydrous borax in the amount of 29% total weight and No. 2 diesel fuel (off-road) in an amount of 71% total weight for approximately 60 minutes utilizing an overhead stirrer initially operated at approximately 650 rpm but then increased to approximately 850 RPM. The resulting stable, non-aqueous suspension of a delayed boron cross-linker contains boron as B203 in an amount of 17.3% by weight.

EXAMPLE VIII

A component for a stable, non-aqueous suspension of a delayed boron cross-linker may be prepared by adding to an mixture 1 part of organophilic clay, such as BARAGEL 3000™ which is available from Rheox, Inc., P.O. Box 700, Highstown, N.J. 08520, USA, for every 12.5 parts of anhydrous borax and then agitating for approximately 10–15 minutes at approximately 600–700 RPM to form a dry blend of organophilic clay and fine anhydrous borax. The resulting dry blend of organophilic clay and fine anhydrous borax may be stored and shipped prior to mixture with a suitable non-aqueous solvent, such as No. 2 diesel fuel (off road). The stable, non-aqueous suspension of the delayed boron cross-linker may be prepared by mixing the dry blend of the organophilic clay and the fine anhydrous borax in the amount of 27% total weight and No. 2 diesel fuel (off-road) in an amount of 73% total weight for approximately 60 minutes utilizing an overhead stirrer operated at approximately 850 RPM. The resulting stable, non-aqueous suspension of a delayed boron cross-linker contains boron as B203 in an amount of 17.3% by weight.

EXAMPLE IX

A component for a stable, non-aqueous suspension of a delayed boron cross-linker may be prepared by adding to an mixture 1 part of organophilic clay, such as BENTONE 990™ which is available from Rheox, Inc., P.O. Box 700, Highstown, N.J. 08520, USA, for every 6.25 parts of anhydrous borax and then agitating for approximately 10–15 minutes at approximately 600–700 RPM to form a dry blend of organophilic clay and fine anhydrous borax. The resulting dry blend of organophilic clay and fine anhydrous borax may be stored and shipped prior to mixture with a suitable non-aqueous solvent, such as No. 2 diesel fuel (off road). The stable, non-aqueous suspension of the delayed boron cross-linker may be prepared by mixing the dry blend of the organophilic clay and the fine anhydrous borax in the amount of 29% total weight and No. 2 diesel fuel (off-road) in an amount of 71% total weight for approximately 60 minutes utilizing an overhead stirrer operated at approximately 850 RPM. The resulting stable, non-aqueous suspension of a delayed boron cross-linker contains boron as B2O3 in an amount of 17.3% by weight.

EXAMPLE X

A component for a stable, non-aqueous suspension of a delayed boron cross-linker may be prepared by adding to an mixture 1 part of organophilic clay, such as BENTONE 34™ which is available from Rheox, Inc., P.O. Box 700, Highstown, N.J. 08520, USA, for every 6.25 parts of anhydrous borax and then agitating for approximately 10–15 minutes at approximately 600–700 RPM to form a dry blend of organophilic clay and fine anhydrous borax. The resulting dry blend of organophilic clay and fine anhydrous borax may be stored and shipped prior to mixture with a suitable non-aqueous solvent, such as No. 2 diesel fuel (off road). The stable, non-aqueous suspension of the delayed boron cross-linker may be prepared by mixing the dry blend of the organophilic clay and the fine anhydrous borax in the amount of 29% total weight and No. 2 diesel fuel (off-road) in an amount of 71% total weight for approximately 60 minutes utilizing an overhead stirrer operated at approximately 850 RPM. The resulting stable, non-aqueous suspension of a delayed boron cross-linker contains boron as B2O3 in an amount of 17.3% by weight.

EXAMPLE XI

A component for a stable, non-aqueous suspension of a delayed boron cross-linker may be prepared by adding to an mixture 1 part of organophilic clay, such as CLAYTONE 40™ which is available from Southern Clay Products, P.O. Box 44, 1212 Church St., Gonzales, Tex. 78629, USA, for every 6.25 parts of anhydrous borax and then agitating for approximately 10–15 minutes at approximately 600–700 RPM to form a dry blend of organophilic clay and fine anhydrous borax. The resulting dry blend of organophilic clay and fine anhydrous borax may be stored and shipped prior to mixture with a suitable non-aqueous solvent, such as No. 2 diesel fuel (off road). The stable, non-aqueous suspension of the delayed boron cross-linker may be prepared by mixing the dry blend of the organophilic clay and the fine anhydrous borax in the amount of 29% total weight and No. 2 diesel fuel (off-road) in an amount of 71% total weight for approximately 60 minutes utilizing an overhead stirrer operated at approximately 850 RPM. The resulting stable, non-aqueous suspension of a delayed boron cross-linker contains boron as B2O3 in an amount of 17.3% by weight.

EXAMPLE XII

A component for a stable, non-aqueous suspension of a delayed boron cross-linker may be prepared by adding to an mixture 1 part of organophilic clay, such as CLAYTONE AF™ which is available from Southern Clay Products, P.O. Box 44, 1212 Church St., Gonzales, Tex. 78629, USA, for every 6.25 parts of anhydrous borax and then agitating for approximately 10–15 minutes at approximately 600–700 RPM to form a dry blend of organophilic clay and fine anhydrous borax. The resulting dry blend of organophilic clay and fine anhydrous borax may be stored and shipped prior to mixture with a suitable non-aqueous solvent, such as No. 2 diesel fuel (off road). The stable, non-aqueous suspension of the delayed boron cross-linker may be prepared by mixing the dry blend of the organophilic clay and the fine anhydrous borax in the amount of 29% total weight and No. 2 diesel fuel (off-road) in an amount of 71% total weight for approximately 60 minutes utilizing an overhead stirrer operated at approximately 850 RPM. The resulting stable, non-aqueous suspension of a delayed boron cross-linker contains boron as B2O3 in an amount of 17.3% by weight.

The suspensions produced using the organophilic clay, boron source, and non-aqueous solvent employing the above-described methods provide stable, pumpable, sources of borate ions suitable for use as cross-linking agents for water soluble polymer solutions utilized in well fracturing operations. To perform a hydraulic fracturing operation utilizing a stable, non-aqueous suspension of a delayed boron cross-linker, a water soluble polymer solution, such as guar, hydroxypropyl guar (HPG), carboxymethyl guar (CMG), or carboxymethyl hydroxypropyl guar (CMPG) is prepared using any of several well known methods such as that disclosed in U.S. Pat. No. 5,160,643. The pH of the water soluble polymer solution is adjusted to between about 8.5 and 12.5. Once the pH of the water soluble polymer solution has been properly adjusted, the stable, non-aqueous suspension of a delayed boron cross-linker is combined with the water soluble polymer solution and the resulting mixture pumped into a formation. As is typical in hydraulic fracturing operations, proppants designed to maintain a highly conductive fracture are usually incorporated into the fracturing solution, together with other typical additives such as surfactants, non-emulsifiers, clay stabilizers, breakers, and the like.

Upon contact with the water-soluble polymer solution, the stable, non-aqueous suspension of a delayed boron cross-linker generates borate ions. More particularly, the borax, boric acid, or the mixture of both, suspended in the organophilic clay-non-aqueous solvent are released from suspension and dissolve into the water soluble polymer solution, thereby releasing borate ions into the water soluble polymer solution. As the borate ions enter the water soluble polymer solution, they act as bonding agents (cross-links) between the molecules of the water soluble polymer solution. The fracturing fluid resulting from the cross-inked water-soluble polymer solution is extremely viscous and transports proppants uniformly into the hydraulically induced fracture in the formation.

An example fracturing fluid may be produced from a water soluble polymer solution and a stable, non-aqueous suspension of a delayed boron cross-linker in the following manner. A 35 pound per thousand gallon of fluid solution of the water soluble polymer solution may be prepared by adding 4.2 gm of guar for every 1000 ml of 2% KCl solution in distilled water and then mixing for 30 minutes at a speed that minimizes air entrainment. At the end of the 30 minutes, 10 pounds per thousand gallons of fluid of sodium thiosulfate penta-hydrate (0.24 gm) is added for every 200 ml of the resulting solution and mixed for 5 minutes. Upon the expiration of the 5 minutes, a 30% sodium hydroxide solution is added to produce a desired pH of between about 8.5 and 12.5 (e.g., 2.0 gallons per thousand gallons of fluid or 0.4 ml per 200 ml of solution) in the water soluble polymer solution. Finally, a stable, non-aqueous suspension of a delayed boron cross-linker as prepared in Example I is added to the water soluble polymer solution in an amount of 1.7 gallons per thousand gallons of fluid or 0.34 ml per 200 ml of water soluble polymer solution. The resulting fracturing fluid may then be pumped into a formation where it becomes viscous to induce a fracture in the rock of the formation. If desired, proppants and other additives well known to one of ordinary skill in the art may be added to the resulting fracturing fluid, which transports the proppants uniformly into the hydraulically induced fracture in the formation.

The stable, non-aqueous suspension of a delayed boron cross-linker of the preferred embodiment exhibits many advantages over currently available delayed borate cross-linking systems. First, the boron is concentrated which permits the easy dilution of the cross-linker to facilitate low rate fracturing operations. Second, a mixture of the organophilic clay and the boron source has the operability advantage of being easily transported in dry form for subsequent mixing with the non-aqueous solvent at the well site. Third, if the cross-linker is shipped in suspended form and settling occurs, the boron source may be easily re-suspended. Fourth, the cross-linker is economic to manufacture because it does not require delay additives or buffers. Fifth, the cross-linker operates to cross-link water soluble polymer solutions in an improved temperature range of from about 80° F. to about 325° F. due to the availability of boron in the boron compound and the absence of chelates (i.e., complexing agents). Sixth, 100% of the total boron in the suspended anhydrous boron compound converts into soluble borate ions because the anhydrous boron compounds are completely water-soluble and the pH of the hydrated polymer solution is between about 8.5 and 12.5. That is, the anhydrous borax and boric acid each comprise pure $B_2O_3$, which completely dissolves in the alkaline water-soluble polymer solutions, thereby releasing borate ions that cross-link the water-soluble polymer. Seventh, the use of different clays in the formulation allows an additional form of built-in delay, which can then be further adjusted by pH control. Finally, the borax, boric acid, or mixtures thereof furnishes a wide range of delay times of from 30 seconds to greater than 10 minutes, while still providing a great degree of precision over those delay times.

The cross-link time resulting from the use of a stable, non-aqueous suspension of a delayed boron cross-linker according to the preferred embodiment may be controlled by varying any one or all of the following:
1) the boron compound used,
2) the particle size of the boron compound in suspension,
3) the pH of the fracturing fluid prior to the addition of the suspension,
4) the concentration (i.e., loading) of the boron suspension in the fracturing liquid,
5) the $B_2O_3$ content in the suspension,
6) the type of clay used in the formulation, and
7) the temperature of the fracturing fluid.

Illustratively, when used under similar conditions, the type of boron compound (i.e., borax, borax acid, or mixtures of both) may be employed effectively to control the exact cross-linking time of the water-soluble solution. More particularly, suspensions of borax cross-link a water soluble polymer solution more slowly than suspensions of boric acid. Accordingly, suspensions of mixtures of both borax and boric acid cross-link water soluble polymer solutions over a range of times between the extreme cross-link ranges produced by suspensions solely of either borax or boric acid.

With respect to the particle size of the suspended borax, boric acid, or mixtures of both, as particle size increases, the time required for the cross-linking of a water-soluble polymer solution increases. Conversely, as the particle size decreases, the time required for the cross-linking of a water soluble decreases. Particle sizes of the borax, boric acid, or mixtures of both suitable for suspension in the organophilic clay-non-aqueous solvent, range from about 20 mesh to about 325 mesh.

The pH of the water soluble polymer solution prior to its cross-linking may be used to control cross-link time. The pH of the water soluble polymer solution affects the solubility rate of the stable, non-aqueous suspension of a delayed boron cross-linker. Specifically, as the pH of the water soluble polymer solution increases, the solubility rate of the cross-linker suspension increases if the suspension contains a majority of boric acid particles, whereas the solubility rate of the cross-linker suspension decreases if the suspension contains a majority of borax particles. Conversely, as the pH of the water soluble polymer solution decreases, the solubility rate of the cross-linker suspension decreases if the suspension contains a majority of boric acid particles, whereas the solubility rate of the cross-linker suspension increases if the suspension contains a majority of borax particles.

Both the concentration (i.e., loading) of the stable, non-aqueous suspension of a delayed boron cross-linker in the water soluble polymer solution and the content of the $B_2O_3$ in the cross-linker suspension affect the cross-link time of a water soluble polymer solution similarly. As either the concentration of the suspension of delayed boron cross-linker in the water-soluble polymer solution or the content of the $B_2O_3$ in the cross-linker suspension increase, the cross-link time of the water soluble polymer solution decreases. Conversely, as either the concentration of the suspension of the delayed boron cross-linker in the water soluble polymer solution and the content of the $B_2O_3$ in the cross-linker suspension decrease, the cross-link time of the water soluble polymer solution increases.

Temperature may be used to alter the cross-link time of a water soluble polymer solution. As the temperature of the water soluble polymer solution increases, its cross-link time decreases. Conversely, as the temperature of the water soluble polymer solution decreases, its cross-link time increases. Furthermore, the cross-link time of a water-soluble polymer may be increased or decreased depending upon the clay type utilized in the formulation of the stable, non-aqueous suspension of a delayed boron cross-linker.

From the foregoing description and illustration of this invention it is apparent that various modifications may be made by reconfigurations or combinations producing similar results. It is, therefore, the desire of the applicant not to be found by the description of this invention as contained in this specification, but to be bound only by the claims as appended hereto.

We claim:

1. A composition for delaying the cross-linking of water soluble polymer solutions, comprising an alkaline earth metal free boron source suspended by an organophilic clay in a solution of a non-aqueous solvent.

2. The composition according to claim 1, wherein the alkaline earth metal free boron source is selected from a group consisting of an anhydrous boron compound and a non-anhydrous boron compound.

3. The composition according to claim 2, wherein the anhydrous boron compound is selected from a group consisting of anhydrous borax, anhydrous boric acid, and mixtures thereof.

4. The composition according to claim 2, wherein the non-anhydrous boron compound is selected from a group consisting of non-anhydrous borax, non-anhydrous boric acid, and mixtures thereof.

5. The composition according to claim 1 wherein the alkaline earth metal free boron source comprises from about 1% to 50% total composition weight.

6. The composition according to claim 1 wherein the organophilic clay is a reaction product of a smectite-type clay and at least one type of organic cation.

7. The composition according to claim 6 wherein the organophilic clay is self-activating.

8. The composition according to claim 6 wherein the organophilic clay is non-self-activating.

9. The composition according to claim 1 wherein the organophilic clay comprises from about 0.5% to 15% total composition weight.

10. The composition according to claim 1 wherein the non-aqueous solvent is a hydrocarbon solvent.

11. The composition according to claim 10 wherein the hydrocarbon solvent is diesel.

12. The composition according to claim 1 wherein the non-aqueous solvent is selected from a group consisting of mineral oils, kerosene, alcohols, vegetable oils, ester-alcohols, and polyol ethers.

13. The composition according to claim 1 wherein the non-aqueous solvent comprises from about 53% to 98% total composition weight.

14. A process of manufacturing a composition that delays the cross-linking of water soluble polymer solutions, comprising the steps of:
    suspending an organophilic clay in a non-aqueous solvent; and
    suspending an alkaline earth metal free boron source in the organophilic clay-non-aqueous solvent suspension.

15. The process according to claim 14 wherein the organophilic clay comprises from about 0.5% to 15% total suspension weight.

16. The process according to claim 14 wherein the non-aqueous solvent comprises from about 53% to 98% total suspension weight.

17. The process according to claim 16 wherein the alkaline earth metal free boron source comprises from about 1% to 50% total suspension weight.

18. The process according to claim 14, wherein the alkaline earth metal free boron source is selected from a group consisting of an anhydrous boron compound and a non-anhydrous boron compound.

19. The process according to claim 18, wherein the anhydrous boron compound is selected from a group consisting of anhydrous borax, anhydrous boric acid, and mixtures thereof.

20. The process according to claim 18, wherein the non-anhydrous boron compound is selected from a group consisting of non-anhydrous borax, non-anhydrous boric acid, and mixtures thereof.

21. The process according to claim 14 wherein the organophilic clay is a reaction product of a smectite-type clay and at least one type of organic cation.

22. The process according to claim 21 wherein the organophilic clay is self-activating.

23. The process according to claim 21 wherein the organophilic clay is non-self-activating.

24. The process according to claim 14 wherein the non-aqueous solvent is a hydrocarbon solvent.

25. The process according to claim 24 wherein the hydrocarbon solvent is diesel.

26. The process according to claim 14 wherein the non-aqueous solvent is selected from a group consisting of mineral oils, kerosene, alcohols, vegetable oils, ester-alcohols, and polyol ethers.

27. A process of manufacturing a composition that delays the cross-linking of water soluble polymer solutions, comprising the steps of:
    mixing an alkaline earth metal free boron source and an organophilic clay to form a dry mixture; and
    suspending the dry mixture of the alkaline earth metal free boron source and the organophilic clay in a non-aqueous solvent.

28. The process according to claim 27 wherein the dry mixture of the alkaline earth metal free boron source and the organophilic clay is suitable for storage and shipping prior to suspension in the non-aqueous solvent.

29. The process according to claim 27 wherein the organophilic clay comprises from about 0.5% to 15% total suspension weight.

30. The process according to claim 27 wherein the non-aqueous solvent comprises from about 53% to 98% total suspension weight.

31. The process according to claim 27 wherein the alkaline earth metal free boron source comprises from about 1% to 50% total suspension weight.

32. The process according to claim 27, wherein the alkaline earth metal free boron source is selected from a group consisting of an anhydrous boron compound and a non-anhydrous boron compound.

33. The process according to claim 32, wherein the anhydrous boron compound is selected from a group consisting of anhydrous borax, anhydrous boric acid, and mixtures thereof.

34. The process according to claim 32, wherein the non-anhydrous boron compound is selected from a group consisting of non-anhydrous borax, non-anhydrous boric acid, and mixtures thereof.

35. The process according to claim 27 wherein the organophilic clay is a reaction product of a smectite-type clay and at least one type of organic cation.

36. The process according to claim 35 wherein the organophilic clay is self-activating.

37. The process according to claim 35 wherein the organophilic clay is non-self-activating.

38. The process according to claim 27 wherein the non-aqueous solvent is a hydrocarbon solvent.

39. The process according to claim 38 wherein the hydrocarbon solvent is diesel.

40. The process according to claim 27 wherein the non-aqueous solvent is selected from a group consisting of mineral oils, kerosene, alcohols, vegetable oils, ester-alcohols, and polyol ethers.m

* * * * *